United States Patent
Schlichting et al.

(10) Patent No.: US 7,875,370 B2
(45) Date of Patent: Jan. 25, 2011

(54) THERMAL BARRIER COATING WITH A PLASMA SPRAY TOP LAYER

(75) Inventors: Kevin W. Schlichting, Storrs, CT (US); Michael J. Maloney, Marlborough, CT (US); David A. Litton, Rocky Hill, CT (US); Melvin Freling, West Hartford, CT (US); John G. Smeggil, Simsbury, CT (US); David Snow, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 832 days.

(21) Appl. No.: 11/506,376

(22) Filed: Aug. 18, 2006

(65) Prior Publication Data

US 2008/0044662 A1    Feb. 21, 2008

(51) Int. Cl.
*B32B 9/00* (2006.01)

(52) U.S. Cl. .................. 428/699; 428/689; 428/697; 428/701; 428/702

(58) Field of Classification Search ............ 428/689, 428/697, 699, 701, 702
See application file for complete search history.

(56) References Cited

U.S. PATENT DOCUMENTS

| | | | |
|---|---|---|---|
| 5,705,231 A | 1/1998 | Nissley et al. | |
| 5,914,189 A | 6/1999 | Hasz et al. | |
| 6,177,200 B1 | 1/2001 | Maloney | |
| 6,716,539 B2 | 4/2004 | Subramanian | |
| 6,875,529 B1 * | 4/2005 | Spitsberg et al. | 428/701 |
| 6,982,126 B2 | 1/2006 | Darolia et al. | |
| 7,255,940 B2 | 8/2007 | Spitsberg et al. | |
| 7,326,470 B2 | 2/2008 | Ulion et al. | |
| 7,347,663 B2 | 3/2008 | Nakahama et al. | |
| 2007/0160859 A1 | 7/2007 | Darolia et al. | |

FOREIGN PATENT DOCUMENTS

| | | |
|---|---|---|
| EP | 0266299 A2 | 5/1988 |
| EP | 0605196 A1 | 7/1994 |
| EP | 0992603 A1 | 4/2000 |
| EP | 1111091 A1 | 6/2001 |
| EP | 1536039 A1 | 6/2005 |
| EP | 1559811 A1 | 8/2005 |
| EP | 1621646 A2 | 2/2006 |
| EP | 1642993 A1 | 4/2006 |
| JP | 9316622 A | 12/1997 |
| JP | 10502310 T | 3/1998 |
| JP | 10505299 T | 5/1998 |
| JP | 2000119870 A | 4/2000 |
| JP | 2002115081 A | 4/2000 |
| JP | 2003321761 A | 11/2003 |
| JP | 2006104577 A | 4/2006 |
| JP | 2007182631 A | 7/2007 |
| WO | 9631293 A1 | 10/1996 |
| WO | 2007/112783 A1 | 10/2007 |

OTHER PUBLICATIONS

European Search Report for EP07253170.0, dated May 21, 2008.

\* cited by examiner

*Primary Examiner*—Gwendolyn Blackwell
(74) *Attorney, Agent, or Firm*—Bachman & LaPointe, P.C.

(57) ABSTRACT

A turbine engine component has a substrate, a thermal barrier coating deposited onto the substrate, and a sealing layer of ceramic material on an outer surface of the thermal barrier coating for limiting molten sand penetration.

18 Claims, 1 Drawing Sheet

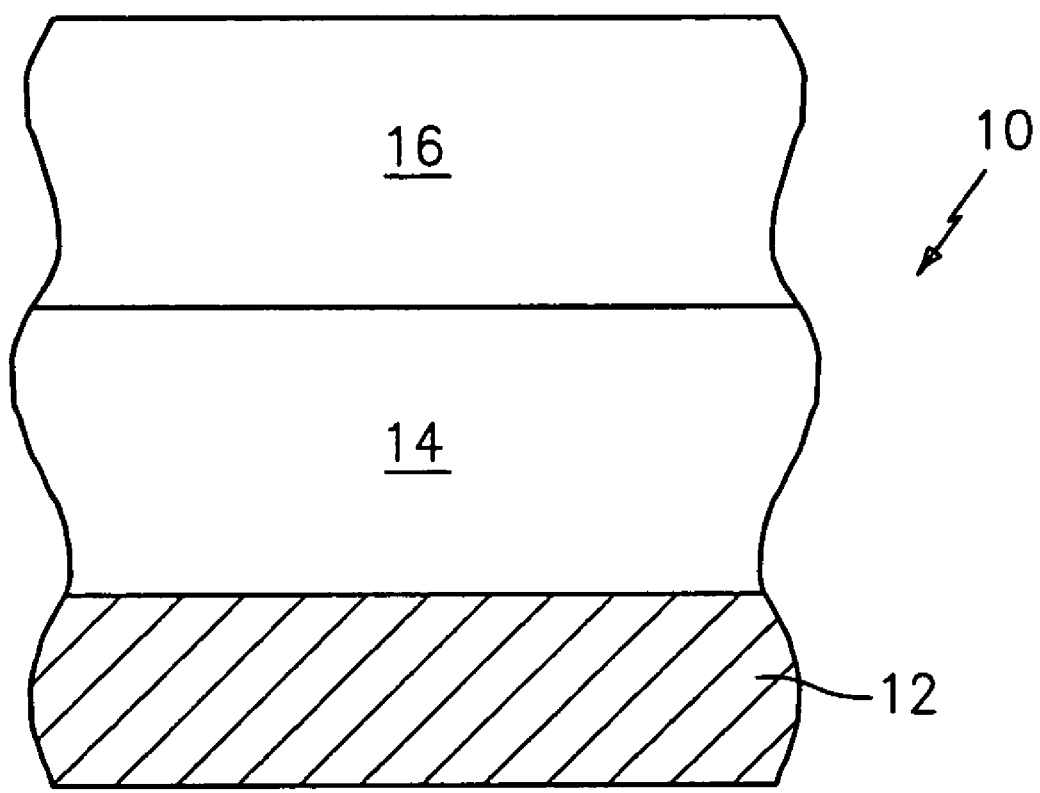

THERMAL BARRIER COATING WITH A PLASMA SPRAY TOP LAYER

BACKGROUND (1) Field of the Invention

The present invention relates to the use of a plasma sprayed outer layer on top of a thermal barrier coating to block the penetration of molten sands into the thermal barrier coating.

(2) Prior Art

Turbine engine airfoils used in desert environments may degrade due to sand related distress of thermal barrier coatings. The mechanism for such distress is believed to be caused by the penetration of fluid sand deposits into 7YSZ ceramic thermal barrier coatings that leads to spallation and then accelerated oxidation of exposed metal. It has been observed that gadolinia stabilized zirconia coatings react with fluid sand deposits and a reaction product forms that inhibits fluid sand penetration into the coating. The reaction product has been identified as being a silicate oxyapatite/garnet containing primarily gadolinia, calcia, zirconia, and silica.

There remains a need however for a coating system which effectively deals with sand related distress.

SUMMARY OF THE INVENTION

A turbine engine component is provided which uses an air plasma sprayed outer layer on top of a thermal barrier coating to block the penetration of molten sands into the thermal barrier coating.

In accordance with the present invention, there is provided a turbine engine component which broadly comprises a substrate, a thermal barrier coating deposited onto the substrate, and means for sealing an outer surface of the thermal barrier coating and thereby limiting molten sand penetration into the thermal barrier coating.

Further in accordance with the present invention, there is provided a method for forming a coating on a turbine engine component broadly comprising the steps of forming a thermal barrier coating on a surface of the turbine engine component, and plasma spraying a sealing layer onto the thermal barrier coating.

Other details of the thermal barrier coating with a plasma-spray top layer of the present invention, as well as other objects and advantages attendant thereto, are set forth in the following detailed description and the accompanying drawings wherein like reference numerals depict like elements.

BRIEF DESCRIPTION OF THE DRAWINGS

The FIGURE is a schematic representation of a thermal barrier coating system in accordance with the present invention.

DETAILED DESCRIPTION OF THE PREFERRED EMBODIMENT(S)

Referring now to the FIGURE, there is shown a turbine engine component 10, such as a blade, a vane, a combustor panel, or a seal having a substrate 12, such as an airfoil portion or a platform portion of a blade or vane or a portion of a combustor panel or a portion of a seal, and a thermal barrier coating 14 on at least one surface of the substrate 12. The substrate 12 may be formed from any suitable material known in the art such as a nickel based superalloy, a cobalt based superalloy, molybdenum, or niobium. Alternatively, the substrate 12 may be a ceramic based substrate or a ceramic matrix composite substrate.

The thermal barrier coating 14 may comprise one or more layers of a ceramic material such as a yttria stabilized zirconia material or a gadolinia stabilized zirconia material. The yttria stabilized zirconia material may contain from 1.0 to 25 wt % yttria and the balance zirconia. The gadolinia stabilized zirconia material may contain from 5.0 to 99 wt % gadolinia, more preferably 30 to 70 wt %, and the balance zirconia. The ceramic material layer(s) may be deposited using any suitable method known in the art.

The thermal barrier coating 14 may be applied using any suitable technique known in the art such as electron beam physical vapor deposition, thermal spray, sol-gel, slurry, chemical vapor deposition, and sputtering. The use of different spray parameters will create distinctly different microstructures which would differentiate between the layers, i.e. a dense top sealing layer with a porous bottom layer. A preferred method for depositing the thermal barrier coating is by electron bean physical vapor deposition (EB-PVD). The deposition may occur in a chamber with a temperature of from 1700 to 2000° F. and a pressure of from 0.05 to 2.0 millitors. The ceramic feedstock may be feed at a rate of 0.3 to 2.0 inches per hour with a coating time from 20 to 120 minutes.

If desired a bond coated may be deposited on the substrate prior to the application of the thermal barrier coating 14. The bond coat may be either a MCrAly coating where M is nickel and/or cobalt, an aluminide coating, a platinum aluminide coating, a ceramic based bond coat, or a silica based bond coat. The bond coat may be applied using any suitable technique known in the art.

After the thermal barrier coating 14 has been applied to the substrate 12, a plasma-sprayed layer 16 is applied on top of the thermal barrier coating. The plasma-sprayed layer 16 is preferably formed from a ceramic material such as yttria stabilized zirconia. The layer 16 may be formed using a plasma-spray gun operating at from 30 to 70 volts and from 300 to 900 amps. A mixture of argon and helium or argon and hydrogen may be used as the carrier gas. The gun may have a standoff distance from 2 to 8 inches and a ceramic powder flow rate of from 30 to 70 grams per minute. The resulting structure is a two-layer ceramic where the plasma-sprayed layer 16 is preferably on the outer surface. The two layers 14 and 16 may not have a defined interface, but they may rather blend together.

Plasma-sprayed coatings are formed by injecting powder, either metallic or ceramic, into a plasma plume where the material is heated and accelerated toward the substrate to be coated. The molten or semi-molten particles impact the substrate and form a splat or pancake type structure. The coating thickness is built up as additional molten particles impact the substrate and form splats. As these splats build up, defects are incorporated into the coating such as porosity (both micro and macro), cracks, and splat boundaries. Spray parameters can be adjusted to yield a very dense or porous coating depending on the application. The resulting structure of the outer plasma-sprayed layer acts as a barrier to prevent the penetration of molten sand into the thermal barrier coating below due to its lower porosity and more tortuous path. The average porosity for the EB-PVD coating layer 14 can be anywhere from 10 to 20%, while the porosity of the plasma-sprayed coating layer 16 can be from 2.0 to 30% depending on the parameters used.

The benefit of the present invention is a thermal barrier coating system that resists penetration of molten silicate material and provides enhanced durability in environments where sand induced distress of turbine airfoils occurs. The outer plasma sprayed layer seals the surface of the thermal barrier coating to limit molten sand from penetrating therein.

It is apparent that there has been provided in accordance with the present invention a thermal barrier coating with a plasma-spray top layer which fully satisfies the objects, means, and advantages set forth hereinbefore. While the present invention has been described in the context of specific embodiments thereof, other unforseeable alternatives, modifications and variations may become apparent to those skilled in the art having read the foregoing description. Accordingly, it is intended to embrace those alternatives, modifications, and variations as fall within the broad scope of the appended claims.

What is claimed is:

1. A turbine engine component comprising:
   a substrate;
   a thermal barrier coating deposited onto said substrate;
   said thermal barrier coating comprising at least one layer having a porosity in the range of from 10 to 20%;
   means for sealing an outer surface of said thermal barrier coating and limiting molten sand penetration deposited into said thermal barrier coating, said sealing means comprising a plasma sprayed outer ceramic layer deposited onto said thermal barrier coating; and
   said plasma sprayed outer ceramic layer having a splat structure and a porosity in the range of from 2.0 to 30% so as to create a tortuous path through said outer ceramic layer which acts as a barrier to prevent the penetration of molten sand into the thermal barrier coating.

2. The turbine engine component according to claim 1, wherein said outer ceramic layer consists of yttria stabilized zirconia.

3. The turbine engine component according to claim 1, wherein said ceramic material comprises a yttria stabilized zirconia consisting of from 1.0 to 25 wt % yttria and the balance zirconia.

4. The turbine engine component according to claim 1, wherein said ceramic material comprises a gadolinia stabilized zirconia consisting of from 5.0 to 99 wt % gadolinia and the balance zirconia.

5. The turbine engine component according to claim 4, wherein said gadolinia is present in an amount of from 30 to 70 wt %.

6. The turbine engine component according to claim 1, further comprising a bond coat between said substrate and said thermal barrier coating.

7. The turbine engine component according to claim 6, wherein said bond coat is formed from a material selected from the group of a MCrAlY coating, an aluminide coating, a platinum aluminide coating, a ceramic based material, and a silica based material.

8. The turbine engine component according to claim 1, wherein said turbine engine component comprises a blade.

9. The turbine engine component according to claim 1, wherein said turbine engine component comprises a vane.

10. The turbine engine component according to claim 1, wherein said turbine engine component comprises a combustor panel.

11. The turbine engine component according to claim 1, wherein said turbine engine component comprises a seal.

12. A turbine engine component comprising:
    a substrate;
    a thermal barrier coating on at least a portion of said substrate;
    said thermal barrier coating comprising at least one layer having a porosity in the range of from 10 to 20%;
    a sealing layer on at least a portion of said thermal barrier coating, said sealing layer capable of limiting molten sand penetration into said thermal barrier coating; and
    said sealing layer comprising a plasma sprayed outer ceramic layer having a splat structure and a porosity in the range of from 2.0 to 30% so as to create a tortuous path through said outer ceramic layer which acts as a barrier to prevent the penetration of molten sand into the thermal barrier coating.

13. The turbine engine component of claim 12, wherein said outer ceramic layer consists of yttria stabilized zirconia.

14. The turbine engine component of claim 12, wherein said ceramic material comprises a yttria stabilized zirconia consisting of from 1.0 to 25 wt % yttria and the balance zirconia.

15. The turbine engine component of claim 12, wherein said ceramic material comprises a gadolinia stabilized zirconia consisting of from 5.0 to 99 wt % gadolinia and the balance zirconia.

16. The turbine engine component of claim 14, wherein said gadolinia is present in an amount from 30 to 70 wt %.

17. The turbine engine component according to claim 12, further comprising a bond coat between said substrate and said thermal barrier coating.

18. The turbine engine component according to claim 17, wherein said bond coat is formed from a material selected from the group of a MCrAlY coating, an aluminide coating, a platinum aluminide coating, a ceramic based material, and a silica based material.

* * * * *